United States Patent
Schuler et al.

(10) Patent No.: US 6,214,925 B1
(45) Date of Patent: Apr. 10, 2001

(54) PRESSURE-SENSITIVE MATERIALS WITH SMALL AMOUNTS OF STYRENE

(75) Inventors: Bernhard Schuler, Mannheim; Gerhard Auchter, Bad Dürkheim; Johannes Türk, Böhl-Iggelheim; Rik Noordijk, Limburgerhof; Johannes Dobbelaar, Wachenheim; Reinhard Bächer, Bad Dürkheim; Wolfgang Hümmer, Birkenheide, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/147,660

(22) PCT Filed: Jul. 29, 1997

(86) PCT No.: PCT/EP97/04102

§ 371 Date: Feb. 9, 1999

§ 102(e) Date: Feb. 9, 1999

(87) PCT Pub. No.: WO98/06763

PCT Pub. Date: Feb. 19, 1998

(30) Foreign Application Priority Data

Aug. 9, 1996 (DE) .............................. 196 32 203

(51) Int. Cl.$^7$ .................................... C08L 31/00
(52) U.S. Cl. ................ 524/556; 524/272; 524/560; 524/561; 524/562; 526/317.1; 526/324; 526/329.7; 428/522

(58) Field of Search .................. 524/272, 556, 524/560, 561, 562; 526/317.1, 324, 329.7; 428/522

(56) References Cited

U.S. PATENT DOCUMENTS

| 4,371,659 | * | 2/1983 | Druschke et al. . |
| 5,405,693 | * | 4/1995 | Dittrich et al. . |
| 5,416,134 | * | 5/1995 | Skoglund . |

FOREIGN PATENT DOCUMENTS

| 1 329 443 | * | 5/1994 | (CA) . |
| 30 13 812 | * | 10/1981 | (DE) . |
| 37 10441 | * | 10/1988 | (DE) . |
| 0 625 557 | * | 11/1994 | (EP) . |
| 956 799 | * | 4/1964 | (GB) . |
| 2 168 990 | * | 7/1986 | (GB) . |

* cited by examiner

Primary Examiner—Mark L. Warzel
(74) Attorney, Agent, or Firm—Oblon, Spivak, McClelland, Maier & Neustadt, P.C.

(57) ABSTRACT

A polymer which is composed of
from 50 to 99.98% by weight of a $C_1$–$C_{12}$ alkyl (meth) acrylate a),
from 0.02 to 1.8% by weight of a vinyl-aromatic compound b),
from 0 to 10% by weight of an ethylenically unsaturated acid or an ethylenically unsaturated acid anhydride c), and
from 0 to 40% by weight of other monomers d), the percentages by weight being based on the polymer.

19 Claims, No Drawings

PRESSURE-SENSITIVE MATERIALS WITH SMALL AMOUNTS OF STYRENE

BACKGROUND OF THE INVENTION

1. Field of the Invention

The invention relates to a polymer composed of from 50 to 99.98% by weight of a $C_1$–$C_{12}$ alkyl (meth) acrylate a), from 0.02 to 1.8% by weight of a vinyl-aromatic compound b), from 0 to 10% by weight of an ethylenically unsaturated acid or an ethylenically unsaturated acid anhydride c), and from 0 to 40% by weight of other monomers d), the percentages by weight being based on the polymer.

Furthermore, the invention relates to the use of the polymers or their aqueous dispersions.

2. Description of the Background

Pressure-sensitive adhesives (PSAs) form a permanent tacky film which at room temperature, even under slight pressure, sticks to a very wide variety of surfaces. Pressure-sensitive adhesives are used to produce self-adhesive products such as self-adhesive labels, tapes and films. Products of this kind are very simple to use and make it possible to work rapidly when bonding. In contrast to contact adhesive compositions, no ventilation times are necessary. Moreover, there is no "open time" within which the adhesive bond must be implemented. The quality of a self-adhesive article depends essentially on whether the internal strength (cohesion) and the sticking of the adhesive film on the surface that is to be bonded (adhesion) are set properly in relation to one another in accordance with the utility.

In the case of pressure-sensitive adhesives for labels, in particular, the level of cohesion must be sufficient for no stringing and no emergence of glue at the edges to occur in the course of stamping and cutting, since otherwise the cutting tools become soiled and the cut faces sticky. At the same time, the adhesion should be at a high level in order to obtain good sticking on the substrate that is to be bonded.

In general it is impossible to optimize adhesion and cohesion independently of one another. There is a desire for measures which either lift the level of both properties or, at least, maintain one property unchanged while improving the other.

Adhesives, including pressure-sensitive adhesives, based on polymers which can contain styrene are already known from DE-A-3 013 812, U.S. Pat. No. 5,416,134 and EP-A-625 557. The polymers prepared or used in the examples of these disclosures, however, contain at least 4% by weight styrene. Copolymers of this kind still do not have the desired level of adhesion and cohesion or the desired ratio of adhesion to cohesion.

SUMMARY OF THE INVENTION

It is an object of the present invention, therefore, to provide polymers of improved adhesion and/or cohesion.

We have found that this object is achieved by the polymers defined above and their use as pressure-sensitive adhesives.

DETAILED DESCRIPTION OF THE PREFERRED EMBODIMENTS

The novel polymer preferably contains at least 0.05% by weight of a vinyl-aromatic compound and preferably not more than 1.5% by weight, in particular not more than 1.0% by weight, particularly preferably not more than 0.5% by weight, of the vinyl-aromatic compound.

Preferred polymers are composed of from 50 to 99.98%
  by weight of a $C_1$–$C_{12}$ alkyl (meth)acrylate a)
from 0.02 to 1.5%
  by weight of a vinyl-aromatic compound b)
from 0 to 10% by
  weight of an ethylenically unsaturated acid c)
from 0 to 40% by
  weight of other monomers d) which are different from a) to c)

Particularly preferred polymers are composed of

| from 60 to 99.95 | % by weight of | a) |
| from 0.05 to 1 | % by weight of | b) |
| from 0 to 5 | % by weight of | c) |
| from 0 to 35 | % by weight of | d) |

Especially preferred polymers are composed of

| from 80 to 99.8 | % by weight of | a) |
| from 0.2 to 1 | % by weight of | b) |
| from 0 to 2 | % by weight of | c) |
| from 0 to 18 | % by weight of | d) |

In one particular embodiment the content of monomers c) is at least 0.1% by weight, the maximum content of components a) lowering accordingly.

Particularly suitable $C_1$–$C_{12}$ alkyl (meth)acrylates are methyl acrylate, methyl methacrylate, ethyl acrylate, n-butyl acrylate and 2-ethylhexyl acrylate, n-butyl methacrylate, t-butyl methacrylate, isobutyl acrylate and isooctyl acrylate.

In one particularly preferred embodiment the monomers a) necessarily include $C_1$–$C_2$-alkyl (meth)acrylate (monomers $a_1$)) in addition to $C_3$–$C_{12}$-alkyl (meth)acrylates (monomers $a_2$)).

In particular, from 5 to 50% by weight, preferably from 10 to 40% by weight, particularly preferably from 10 to 20% by weight, of the overall amount of monomers a) are monomers $a_1$), i.e. methyl (meth)acrylate or ethyl (meth)acrylate, preferably methyl acrylate.

Preferred vinyl-aromatic compounds are those having up to 20 carbon atoms. Suitable examples are vinyltoluene and α- and β-methyl-styrene. Styrene is particularly preferred.

Examples of ethylenically unsaturated acids or anhydrides c) are maleic acid, fumaric acid, itaconic acid and, preferably, acrylic acid and/or methacrylic acid, (meth) acrylic anhydride or maleic anhydride.

Other monomers which may be mentioned are, in particular, alkyl (meth)acrylates having more than 12 carbon atoms in the alkyl radical, hydroxyl-containing monomers, especially $C_1$–$C_{10}$-hydroxy-alkyl (meth)acrylates, vinyl esters of $C_1$–$C_{20}$ carboxylic acids, examples being vinyl acetate, vinyl propionate and vinyl ethers, preferably of $C_1$–$C_4$ alcohols, for example vinyl methyl ether or vinyl isobutyl ether, and $C_2$–$C_8$ hydrocarbons having one or two ethylenically unsaturated groups, for example ethylene, butadienes or isoprene, and monomers containing nitrile groups, for example (meth)acrylonitrile.

The monomers can be polymerized preferably by free-radical means or, where possible, anionically. As customary polymerization methods, both free-radical and anionic polymerization are familiar to the skilled worker.

Free-radical polymerization can be carried out, for example, in solution, such as in an organic solvent (solution polymerization), in aqueous dispersion (emulsion polymerization, suspension polymerization) or in bulk, i.e. essentially in the absence of water or organic solvents (bulk polymerization).

The novel polymer is preferably prepared by emulsion polymerization.

The emulsion polymerization is carried out using ionic and/or nonionic emulsifiers and/or protective colloids and/or stabilizers as surface-active compounds.

A detailed description of suitable protective colloids is given in Houben-Weyl, Methoden der organischen Chemie, volume XIV/1, Makromolekulare Stoffe, Georg-Thieme-Verlag, Stuttgart, 1961, pp. 411–420. Suitable emulsifiers include anionic, cationic and nonionic emulsifiers. As accompanying surface-active substances it is preferred to use exclusively emulsifiers, whose molecular weights—unlike those of the protective colloids—are usually below 2,000 g/mol. Where mixtures of surface-active substances are used the individual components must of course be mutually compatible, which in case of doubt can be checked using a few preliminary experiments. Anionic and nonionic emulsifiers are preferably used as surface-active substances. Examples of customary accompanying emulsifiers are ethoxylated fatty alcohols (EO degree: 3 to 50, alkyl radical: $C_8$ to $C_{36}$), ethoxylated mono-, di- and tri-alkylphenols (EO degree: 3 to 50, alkyl radical: $C_4$ to $C_9$), alkali metal salts of dialkyl esters of sulfosuccinic acid, and alkali metal salts and ammonium salts of alkyl sulfates (alkyl radical: $C_8$ to $C_{12}$), of ethoxylated alkanols (EO degree: 4 to 30, alkyl radical: $C_{12}$ to $C_{18}$), of ethoxylated alkylphenols (EO degree: 3 to 50, alkyl radical: $C_4$ to C9), of alkylsulfonic acids (alkyl radical: $C_{12}$ to $C_{18}$) and of alkylarylsulfonic acids (alkyl radical: $C_9$ to $C_{18}$).

Other suitable emulsifiers are compounds of the formula II

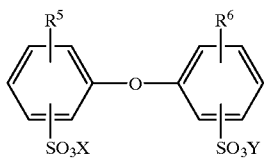

in which $R^5$ and $R^6$ are hydrogen or $C_4$–$C_{14}$-alkyl but are not both hydrogen, and X and Y can be alkali metal ions and/or ammonium ions. $R^5$ and $R^6$ are preferably linear or branched alkyls having 6 to 18 carbons, or hydrogen, and in particular have 6, 12 or 16 carbons, and are not both simultaneously hydrogen. X and Y are preferably sodium, potassium or ammonium ions, sodium being particularly preferred. Particularly advantageous compounds II are those in which X and Y are sodium, $R^5$ is branched $C_{12}$-alkyl and $R^6$ is hydrogen or $R^5$. In many cases use is made of technical-grade mixtures containing a proportion of from 50 to 90% by weight of the monoalkylated product, an example being Dowfax® 2A1 (trademark of Dow Chemical Company).

Suitable emulsifiers are also given in Houben-Weyl, loc. cit., pp. 192–208.

Examples of commercial emulsifiers are Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL, Emulphor NPS 25.

The surface-active substance is normally used in amounts of from 0.1 to 10% by weight, based on the monomers that are to be polymerized.

Examples of water-soluble initiators for the emulsion polymerization are ammonium salts and alkali metal salts of peroxodisulfuric acid, e.g. sodium peroxodisulfate, hydrogen peroxide or organic peroxides, e.g. tert-butyl hydroperoxide.

Reduction-oxidation (redox) initiator systems are particularly suitable, consisting of at least one, usually inorganic reducing agent and of an inorganic or organic oxidizing agent.

The oxidation component comprises, for example, the above-mentioned initiators for emulsion polymerization.

The reduction component comprises, for example, alkali metal salts of sulfurous acid, such as sodium sulfite, sodium hydrogen sulfite, alkali metal salts of disulfurous acid, such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to exist in a plurality of valency states.

Examples of common redox initiator systems are ascorbic acid/iron(II) sulfate/sodium peroxodisulfate, tert-butyl hydroperoxide/sodium disulfite, and tert-butyl hydroperoxide/Na hydroxymethanesulfinate. The individual components, for example the reduction component, may also be mixtures, for example a mixture of the sodium salt of hydroxymethanesulfinic acid with sodium disulfite.

The abovementioned compounds are mostly employed in the form of aqueous solutions, the lower concentration being determined by the amount of water which is acceptable in the dispersion and the upper concentration by the solubility of the relevant compound in water. In general the concentration is from 0.1 to 30% by weight, preferably from 0.5 to 20% by weight, particularly preferably from 1.0 to 10% by weight, based on the solution.

The amount of initiators is generally from 0.1 to 10% by weight, preferably from 0.5 to 5% by weight, based on the monomers that are to be polymerized. It is also possible to use a plurality of different initiators in the course of the emulsion polymerization.

In addition, regulators can also be added during polymerization, thereby reducing the molar mass. Examples of suitable regulators are compounds containing a thiol group, such as tert-butyl mercaptan, ethylacryl [sic] thioglycolate, mercaptoethanol, mercaptopropyltrimethoxysilane or tert-dodecyl mercaptan. The proportion of these regulators can be in particular from 0 to 0.3% by weight, preferably from 0.02 to 0.3% by weight, based on the polymer.

The emulsion polymerization is generally conducted at from 30 to 950°C., preferably from 50 to 90°C. The polymerization medium can consist either just of water or of mixtures of water and water-miscible liquids such as methanol. Preferably, only water is used. The emulsion polymerization can be carried out either batchwise or in the form of a feed process, including a stepwise or gradient procedure. Preference is given to the feed process, in which some of the polymerization batch is introduced as 40 initial charge, heated to the polymerization temperature and then initially polymerized, and then the remainder of the polymerization batch is supplied, in the course of continuing polymerization, to the polymerization zone continuously, stepwise or under a concentration gradient and usually by way of a plurality of spatially separate feed streams, of which one or more contain the monomers in pure or emulsified form.

The manner in which the initiator is added to the polymerization vessel in the course of the free-radical aqueous emulsion polymerization is familiar to the person of average skill in the art. It can either be included entirely in the initial charge to the polymerization vessel or else introduced stepwise or continuously in the course of the free-radical aqueous emulsion polymerization at the rate at which it is consumed. In an individual case this will depend, as familiar to the person of average skill in the art, both on the chemical nature of the initiator system and on the polymerization temperature. Preferably, some is included in the initial charge and the remainder is supplied to the polymerization zone at the rate at which it is consumed.

In order to remove the residual monomers it is common to add initiator even after the end of the actual emulsion polymerization, i.e. after a monomer conversion of at least 95%.

In the case of the feed process the individual components can be supplied to the reactor from above, laterally or from below, through the reactor base.

The emulsion polymerization produces aqueous polymer dispersions with, in general, solids contents of from 15 to 75% by weight, preferably from 40 to 75% by weight.

For a high space-time yield of the reactor, dispersions of maximum solids content are preferred. In order to make it possible to obtain solids contents >60% by weight, a bimodal or polymodal particle size should be set, since otherwise the viscosity becomes too high and the dispersion can no longer be handled. A new particle generation can be produced, for example, by adding seed (EP 81083), by adding excess amounts of emulsifier or by adding miniemulsions. A further advantage associated with the low viscosity at high solids content is the improved coating characteristics at high solids contents. The production of (a) new particle generation(s) can be done at any desired point in time. It is guided by the particle-size distribution that is desired for a low viscosity.

The novel polymers can be used as adhesives, especially pressure-sensitive adhesives. They are particularly suitable as pressure-sensitive adhesives for labels.

The polymers are preferably used in the form of their aqueous dispersion.

In the case of utility as pressure-sensitive adhesive, a tackifier .ie. a resin providing tack, is preferably added to the polymers or to the aqueous dispersions. Tackifiers are known, for example, from Adhesives Age, July 1987, pp. 19–23 or Polym. Mater. Sci. Eng. 61 (1989) pp. 588–592.

Examples of tackifiers are natural resins, such as rosins and their derivatives produced by disproportionation or by isomerization, polymerization, dimerization and/or hydrogenation. They can be present in their salt form (for example with mono- or polyvalent counterions (cations)) or, preferably, in their esterified form. Alcohols used for the esterification can be monohydric or polyhydric. Examples are methanol, ethanediol, diethylene glycol, triethylene glycol, 1,2,3-propanethiol [sic] and pentaerythritol.

Also used, furthermore, are hydrocarbon resins, eg. coumaroneindene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene and vinyltoluene.

Further compounds increasingly being used as tackifiers are polyacrylates of low molar weight. These polyacrylates preferably have a weight-average molecular weight $M_w$ of below 30,000 and a content of $C_1$–$C_8$ alkyl (meth)acrylates of at least 60% by weight, in particular at least 80% by weight.

Preferred tackifiers are natural or chemically modified rosins. Rosins consist predominantly of abietic acid or of abietic acid derivatives.

The tackifiers can be added in a simple manner to the novel polymers, preferably to the aqueous dispersions of the polymers. In this case, the tackifiers are preferably themselves in the form of an aqueous dispersion.

The proportion of the tackifier is preferably from 5 to 100 parts by weight, particularly preferably from 10 to 50 parts by weight, based on 100 parts by weight of polymer (solids/solids).

In the case of utility as an adhesive, including pressure-sensitive adhesive, it is also possible to use, in addition to tackifiers, for example other additives, such as thickeners, anti-foams, plasticizers, pigments, wetting agents or fillers.

For use as an adhesive, including pressure-sensitive adhesive, the novel polymers and aqueous dispersions or aqueous formulations can be applied by customary methods, for example by rolling, knife coating, spreading, etc., to substrates such as paper or polymer films, preferably consisting of polyethylene, polypropylene, which can be biaxially or monoaxially oriented, polyethylene terephthalate, polyvinyl chloride, polystyrene, polyamide or metal. The water can be removed preferably by drying at from 50 to 150° C. For subsequent use, the side of the substrates, for example the labels, that is coated with the (pressure-sensitive) adhesive can be covered with a release paper, for example siliconized paper.

When used as adhesives the novel polymers exhibit improved cohesion and/or an enhanced adhesion/cohesion ratio.

EXAMPLE

Test Methods a) Preparing the Test Strips

The dispersion to be tested is blended 75:25 (based on solids) with a commercial aqueous rosin ester dispersion (Tacolyn 3179, Hercules). The mixture is applied to siliconized paper in a thin film, using a doctor blade, and is dried at 90° C. for 3 minutes. The gap height of the doctor blade is chosen so that the weight per unit area of the dried adhesive is 19–21 $g/m^2$ White commercial label paper (weight per unit area 80 $g/m^2$) is placed on the dried adhesive and rolled on firmly using a manual roller. The resulting label laminate is cut into 0.5 inch strips 2 cm wide. Prior to testing, the strips are stored under standard atmospheric conditions for at least 24 h.

b) Testing the Shear Strength as a Measure of the Cohesion (in accordance with FINAT FTM 7)

After peeling off the siliconized paper, the label test strip is bonded to the edge of a stainless steel sheet so as to give a bond area of 0.5 inch ×0.5 inch. 20 minutes after bonding, a 500 g weight is fastened to the protruding end of the strip of paper, and the metal sheet is suspended vertically. Ambient conditions: 23° C., 50% relative atmospheric humidity. The shear strength is taken as the time, in minutes, until failure of the adhesive bond under the effect of the weight, as a mean from the results of three test specimens.

c) Testing the Peel Strength as a Measure of the Adhesion (in accordance with FINAT FTM 1)

After peeling off the siliconized paper, a label test strip 2 cm wide is bonded to a stainless steel sheet. Ambient conditions: 230° C., 50% relative atmospheric humidity. 1 minute after bonding, the strip is peeled off at an angle of 180° C. [sic] at a rate of 75 mm/min with the aid of a tensile testing apparatus. The peel strength is taken to be the force, in N/2 cm, required for this, as a mean from the results of three test specimens. In addition, the aspect at fracture is assessed; the key used is as follows:

A adhesive fracture, no residue on the metal plate

K cohesive fracture (separation within the adhesive)

F thin, nonadhesive film on the metal plate; adhesive remains on the paper strip PR paper tears

Comparison Example 1

A solution of 0.75 g of ascorbic acid in 328 g of water is heated with stirring to 85° C. in a polymerization reactor, and then a solution of 0.6 g of sodium peroxodisulfate in 8 g of water is added, while maintaining stirring. After 5 minutes, feed stream 1 is started and is added for the first 10 minutes at a rate of 1.9 g/min. Then, for the next 10 minutes, the rate of addition of feed stream 1 is raised to 3.8 g/min and then for a further 10 minutes to 5.7 g/min. The rate of addition is then raised to 9.96 g/min and held constant over a further 180 minutes. Concurrently with feed stream 1, the addition of a solution of 5.4 g of sodium peroxodisulfate in 72 g of water is started and is continued at a constant rate of addition over 210 minutes. After the end of feed stream 1, stirring is continued at 85° C. for 15 minutes and then the batch is cooled to 80° C. Still at 80° and with stirring, 15 g of a 10% strength solution of tert-butyl hydroperoxide in water and, concurrently, a solution of 1.5 g of sodium disulfite in a mixture of 10 g of water and 1.4 g of acetone are metered in.

Feed Stream 1:

- 340 g of water,
- 51.4 g of a 35% strength aqueous solution of the sodium salt of the sulfuric monoester of nonylphenol ethoxylated with 25 ethylene oxide units
- 15 g of a 25% strength aqueous solution of sodium hydroxide
- 1.05 g of tert-dodecyl mercaptan,
- 7.5 g of acrylic acid (AA),
- 247.5 g of methyl acrylate (MA),
- 870 g of butyl acrylate (BA),
- 375 g of 2-ethylhexyl acrylate (EHA).

Example 1

The procedure of Comparison Example 1 is repeated except that, in feed stream 1, 1.5 g of the methyl acrylate is replaced by styrene (S).

Example 2

The procedure of Comparison Example 1 is repeated except that, in feed stream 1, 3.75 g of the methyl acrylate is replaced by styrene.

Example 3

The procedure of Comparison Example 1 is repeated except that, in feed stream 1, 7.5 g of the methyl acrylate is replaced by styrene.

Example 4

The procedure of Comparison Example 1 is repeated except that, in feed stream 1, 15 g of the methyl acrylate is replaced by styrene.

Comparison Example 2

The procedure of Comparison Example 1 is repeated except that, in feed stream 1, 30 g of the methyl acrylate is replaced by styrene.

TABLE 1

Composition of the copolymers (% by weight)

| Copolymer of | AA | MA | BA | EHA | S |
|---|---|---|---|---|---|
| Comparison Example 1 | 0.5 | 16.5 | 58 | 25 | — |
| Example 1 | 0.5 | 16.4 | 58 | 25 | 0.1 |
| Example 2 | 0.5 | 16.25 | 58 | 25 | 0.25 |
| Example 3 | 0.5 | 16.0 | 58 | 25 | 0.5 |
| Example 4 | 0.5 | 15.5 | 58 | 25 | 1.0 |
| Comparison Example 2 | 0.5 | 14.5 | 58 | 25 | 2.0 |

TABLE 2

Adhesive values

| | Solids content | Peel strength | | Cohesion |
|---|---|---|---|---|
| | [%] | [N/2 cm] | AF* | [min] |
| Comparison Example 1 | 65.2 | 6.8 | F | 42 |
| Example 1 | 65.7 | 7.6 | F | 42 |
| Example 2 | 65.4 | 9.0 | F/C | 55 |
| Example 3 | 65.3 | 10.5 | F/C | 47 |
| Example 4 | 65.2 | 11.8 | F/C | 40 |
| Comparison Example 2 | 63.9 | 18 | F/C | 4 |

*AF: aspect at fracture

Comparison Example 3

The procedure of Comparison Example 1 is repeated except that the monomer composition in feed stream 1 consists of:

- 7.5 g of acrylic acid (AA)
- 247.5 g of methyl acrylate (MA)
- 1020 g of butyl acrylate (BA)
- 225 g of 2-ethylhexyl acrylate (EHA)

Example 5

The procedure of Comparison Example 3 is repeated except that, in feed stream 1, 3.75 g of the methyl acrylate are replaced by styrene.

Example 6

The procedure of Comparison Example 3 is repeated except that, in feed stream 1, 15 g of the methyl acrylate are replaced by styrene.

Table 3: Composition of copolymers in % by weight

| Copolymer of | AA | MA | BA | EHA | S |
|---|---|---|---|---|---|
| Comparison Example 3 | 0.5 | 16.5 | 68 | 15 | — |
| Example 5 | 0.5 | 16.2 | 68 | 15 | 0.25 |
| Example 6 | 0.5 | 15.5 | 68 | 15 | 1.0 |

TABLE 4

| | Adhesive values | | | |
|---|---|---|---|---|
| | Solids content | Peel strength | | Cohesion |
| | [%] | [N/2 cm] | AF* | [min] |
| Comparison Example 3 | 65.2 | 7.3 | F | 48 |
| Example 5 | 65.0 | 15.2 | F/PT | 43 |
| Example 2 | 65.3 | 15.8 | F/C | 33 |

*AF: aspect at fracture

Comparison Example 4

A solution of 0.75 g of ascorbic acid in 281 g of water is heated with stirring to 85° C. in a polymerization reactor, and then a solution of 0.6 g of sodium peroxodisulfate in 15 g of water is added, while maintaining stirring. After 5 minutes, feed stream 1 is started and is added for the first 10 minutes at a rate of 1.9 g/min. Then, for the next 10 minutes, the rate of addition of feed stream 1 is raised to 3.8 g/min and then for a further 10 minutes to 5.7 g/min. The rate of addition is then raised to 9.96 g/min and held constant over a further 180 minutes. Concurrently with feed stream 1, the addition of a solution of 5.4 g of sodium peroxodisulfate in 135 g of water is started and is continued at a constant rate of addition over 210 minutes. After the end of feed stream 1, stirring is continued at 85° C. for 15 minutes and then the batch is cooled to 80° C. Still at 800 and with stirring, 15 g of a 10% strength solution of tert-butyl hydroperoxide in water and, concurrently, a solution of 1.5 g of sodium disulfite in a mixture of 10 g of water and 1.05 g of acetone are metered in.

Feed Stream 1:
  310 g of water,
  51.4 g of a 35% strength aqueous solution of the sodium salt of the sulfuric monoester of nonylphenol ethoxylated with 25 ethylene oxide units
  9.6 g of a 25% strength aqueous solution of sodium hydroxide
  1.05 g of tert-dodecyl mercaptan,
  15 g of methacrylic acid (MAA),
  30 g of hydroxyethyl acrylate (HEA)
  195 g of methyl methacrylate (MMA),
  435 g of butyl acrylate (BA),
  825 g of 2-ethylhexyl acrylate (EHA).

Example 7

The procedure of Comparison Example 1 [sic] is repeated except that, in feed stream 1,
  3.75 g of the methyl methacrylate is replaced by styrene.

Example 8

The procedure of Comparison Example 1 [sic] is repeated except that, in feed stream 1,
  7.5 g of the methyl methacrylate is replaced by styrene.

Example 9

The procedure of Comparison Example 1 [sic] is repeated except that, in feed stream 1,
  15 g of the methyl methacrylate is replaced by styrene.

Comparison Example 5

The procedure of Comparison Example 1 [sic] is repeated except that, in feed stream 1
  30 g of the methyl methacrylate is replaced by styrene.

TABLE 5

| | Composition of the copolymers in % by weight | | | | | |
|---|---|---|---|---|---|---|
| Copolymer of | MAA | HEA | MMA | BA | EHA | S |
| Comparison Example 4 | 1 | 2 | 13 | 29 | 55 | — |
| Comparison Example 5 | 1 | 2 | 11 | 29 | 55 | 2 |
| Example 7 | 1 | 2 | 12.75 | 29 | 55 | 0.25 |
| Example 9 | 1 | 2 | 12.5 | 29 | 55 | 0.5 |
| Example 9 | 1 | 2 | 12 | 29 | 55 | 1 |

TABLE 6

| | Adhesive values | | | |
|---|---|---|---|---|
| | Solids content | Peel strength | | Cohesion |
| | [%] | [N/2 cm] | AF* | [min] |
| Comparison Example 4 | 64.7 | 12.0 | F/PT | 47 |
| Example 7 | 65.1 | 14.8 | F/PT | 46 |
| Example 8 | 64.7 | 18.7 | F/PT | 46 |
| Example 9 | 65.1 | 18.4 | F/PT | 35 |
| Comparison Example 5 | 63.9 | 18.5 | F/PT | 12 |

*AF: aspect at fracture

As evident from the examples, the addition of small amounts of a vinyl-aromatic compound brings about a considerable increase in the adhesion, while the cohesion is virtually unchanged. If the chosen amount of vinyl-aromatic compound is too high, the adhesion remains constant while the cohesion falls to an inadequate level.

We claim:
1. A polymer, which comprises:
  a) from 50 to 99.98% by weight of a $C_1$–$C_{12}$ alkyl (meth)acrylate,
  b) from 0.02 to 1.8% by weight of a vinyl-aromatic compound having up to 20 carbon atoms,
  c) from 0 to 10% by weight of an ethylenically unsaturated acid or an ethylenically unsaturated acid anhydride, and
  d) from 0 to 40% by weight of other monomers,
the percentages by weight being based on the polymer, and conjugated dienes being excluded.

2. A pressure-sensitive adhesive, comprising the polymer as claimed in claim 1.

3. The pressure-sensitive adhesive as claimed in claim 2, additionally comprising a tackifier resin.

4. A substrate coated with a pressure-sensitive adhesive as claimed in claim 2.

5. A method of effecting pressure-sensitive adhesion, which comprises effecting said adhesion with the aqueous dispersion of claim 4.

6. The method as claimed in claim 5, wherein said pressure-sensitive adhesion is effected with labels having the aqueous dispersion of claim 2 applied thereto.

7. An aqueous polymer dispersion, comprising:
  the polymer as claimed in claim 1 which is dispersed in an aqueous medium as prepared by polymerizing the monomer ingredients of the polymer in an aqueous emulsion.

8. The polymer according to claim 1, wherein the amount of said vinyl-aromatic compound (b) ranges from 0.02% to 1.5% by weight.

9. The polymer according to claim 1, wherein the amount of said $C_1$–$C_{12}$-alkyl (meth)acrylate (a) ranges from 60% to 99.95% by weight, the amount of said vinyl-aromatic compound (b) ranges from 0.05% to 1.0% by weight the amount of said ethylenically unsaturated acid or ethylenically unsaturated acid anhydride ranges from 0% to 5% by weight and the amount of said other monomer (d) ranges from 0% to 35% by weight.

10. The polymer according to claim 1, wherein the amount of said $C_1$–$C_{12}$-alkyl (meth)acrylate (a) ranges from 80% to 99.8% by weight, the amount of said vinyl-aromatic compound (b) ranges from 0.25% to 1.0% by weight the amount of said ethylenically unsaturated acid or ethylenically unsaturated acid anhydride ranges from 0% to 2% by weight and the amount of said other monomer (d) ranges from 0% to 18% by weight.

11. A pressure-sensitive adhesive comprising an aqueous polymer dispersion as claimed in claim 7.

12. The pressure-sensitive adhesive as claimed in claim 11, additionally comprising a tackifier resin.

13. A substrate coated with a pressure-scensitive adhesive as claimed in claim 11.

14. A substrate coated with a pressure-sensitive adhesive as claimed in claim 3.

15. A substrate coated with a pressure-sensitive adhesive as claimed in claim 12.

16. The coated substrate according to claim 4, wherein the coated substrate is a label.

17. The coated substrate according to claim 13, wherein the coated substrate is a label.

18. The coated substrate according to claim 14, wherein the coated substrate is a label.

19. The coated substrate according to claim 15, wherein the coated substrate is a label.

* * * * *